United States Patent
Owen

[15] 3,674,158
[45] July 4, 1972

[54] PALLET TYPE PARKING SYSTEM WITH A RETRACTABLE WALKWAY

[72] Inventor: Calvin P. Owen, 5820 Hazeltine 21,, Van Nuys, Calif. 91401

[22] Filed: Dec. 24, 1970

[21] Appl. No.: 101,205

[52] U.S. Cl. .................................................... 214/16.1 CE
[51] Int. Cl. ............................................................ E04h 6/06
[58] Field of Search ................ 214/16.1 R, 16.1 CC, 16.1 CE

[56] References Cited

UNITED STATES PATENTS

| | | | |
|---|---|---|---|
| 1,944,253 | 1/1934 | Martin | 214/16.1 CC |
| 3,148,785 | 9/1964 | Fauconnier | 214/16.1 CC |

FOREIGN PATENTS OR APPLICATIONS

| | | | |
|---|---|---|---|
| 1,287,189 | 1/1962 | France | 214/16.1 CE |

Primary Examiner—Robert G. Sheridan
Assistant Examiner—Raymond B. Johnson
Attorney—Richard K. Macneill

[57] ABSTRACT

A retractable walkway for covering and uncovering roller channels between a drive-on pallet and an elevator in an elevator parking system during passenger loading and unloading which is carried on vertically driven support columns; the walkway having a pair of hinged panes for revealing roller tracks located beneath the walkway in its elevated position to allow a pallet to be transferred on and off an elevator when passengers are not loading and unloading and to cover the roller tracks when the walkway is in an elevated position giving passengers a smoothly surfaced walkway during their loading and unloading.

3 Claims, 5 Drawing Figures

INVENTOR.
CALVIN P. OWEN
BY
Richard K. Macneill

PALLET TYPE PARKING SYSTEM WITH A RETRACTABLE WALKWAY

BRIEF DESCRIPTION OF THE INVENTION

The present invention relates to a retracting walkway and more particularly to a retracting walkway for covering and uncovering roller tracks between a drive-on pallet and an elevator structure.

Upon implementing the invention disclosed and claimed in U.S. Pat. NO. 3,190,467, for an automobile parking system, issued June 22, 1965, it became apparent that a walkway between the drive-on pallet and the elevator mechanism in the drive-through loading and unloading stall was essential due to the exposed roller channels between the drive-on stall and the elevator mechanism. Hence, the present invention is designed to obviate this problem.

According to the invention, a retractable walkway is provided which is carried on vertically movable support columns. The walkway surface has a pair of hinged panels for covering and exposing roller channels which are beneath the walkway in the closed panel position and level with the walkway in the lowered walkway position. This provides a smooth walkway for loading and unloading passengers and provides exposure of the roller channels for the pallet to be moved on and off the parking elevator.

An object of the present invention is the provision of a retractable walkway disposed between a drive-on pallet and a parking elevator.

Another object of the present invention is the provision of a retractable walkway which supplies a smooth walkway surface for loading and unloading passengers in an automobile parking elevator system.

Another object of the invention is the provision of a retractable walkway which is simple and inexpensive to install and extremely convenient in use.

Other objects and many of the attendant advantages of this invention will be readily appreciated as the same becomes better understood by reference to the following detailed description when considered in connection with the accompanying drawings in which like reference numerals designate like parts throughout the FIGS. thereof and wherein.

DETAILED DESCRIPTION OF THE DRAWINGS

Figure 1:
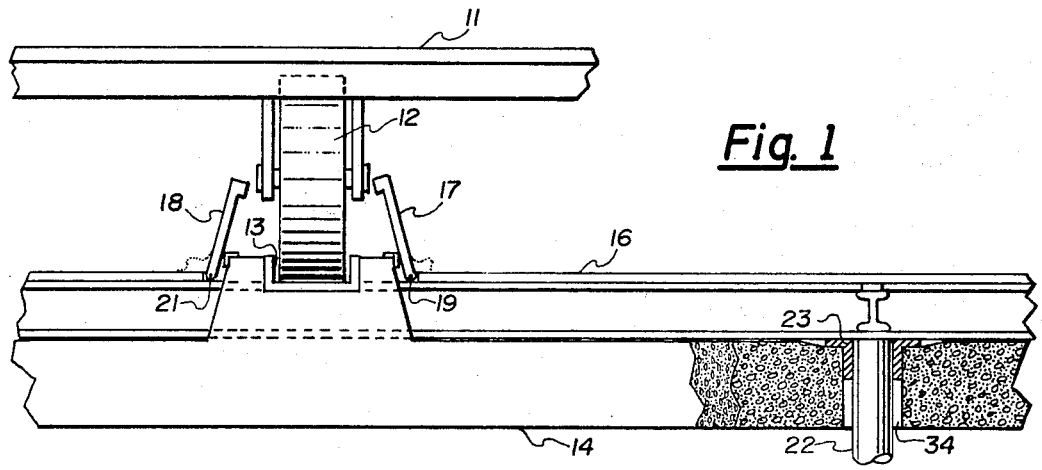
FIG. 1 is a side elevation partially sectioned of the preferred embodiment of the present invention.

Referring to FIG. 1, a pallet 11 is shown having a wheel 12 positioned in roller channel 13 located over concrete floor 14. A walkway 16 carries panels 17 and 18 hinged at 19 and 21, respectively, and is supported by support column 22 slidably received by bushing 23.

Figure 2:
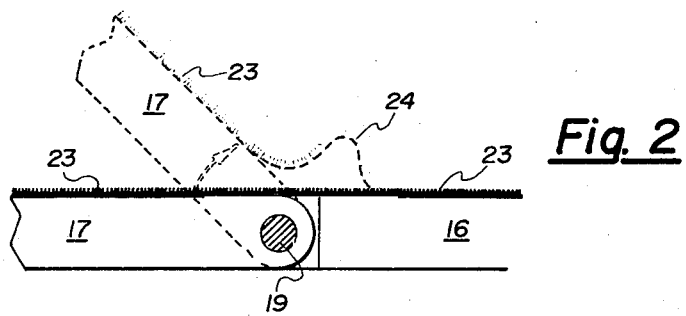
FIG. 2 is a detail of a portion of FIG. 1.

Referring to FIG. 2, panel 17 is shown carried by hinge 19 with a carpeting 23 having an unbonded section 24.

Figure 3:
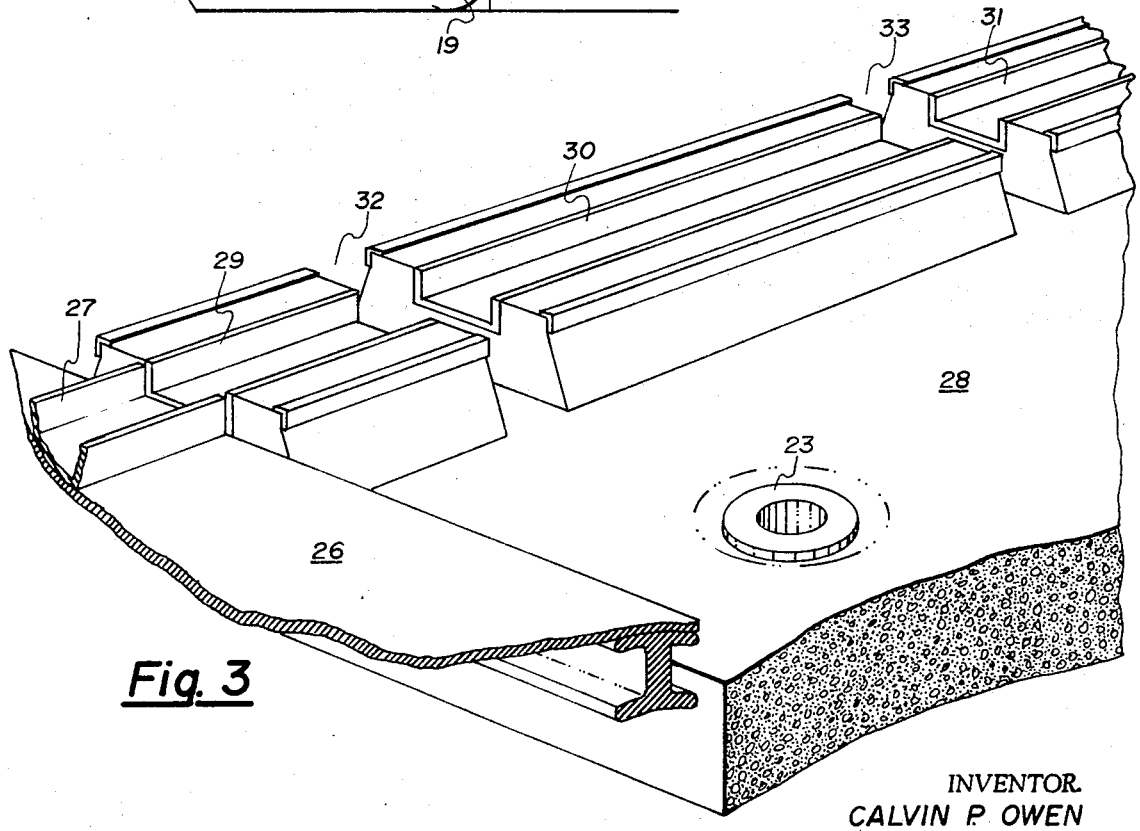
FIG. 3 is a perspective illustration of the environment of the invention

Referring to FIG. 3, elevator 26 carries a roller channel 27 and is adjacent drive-through stall 28. Drive-through stall 28 carries roller channels 29, 30 and 31 which are separated by recesses 32 and 33. Bushing 23 is shown in drive-through stall 28.

Figure 4:
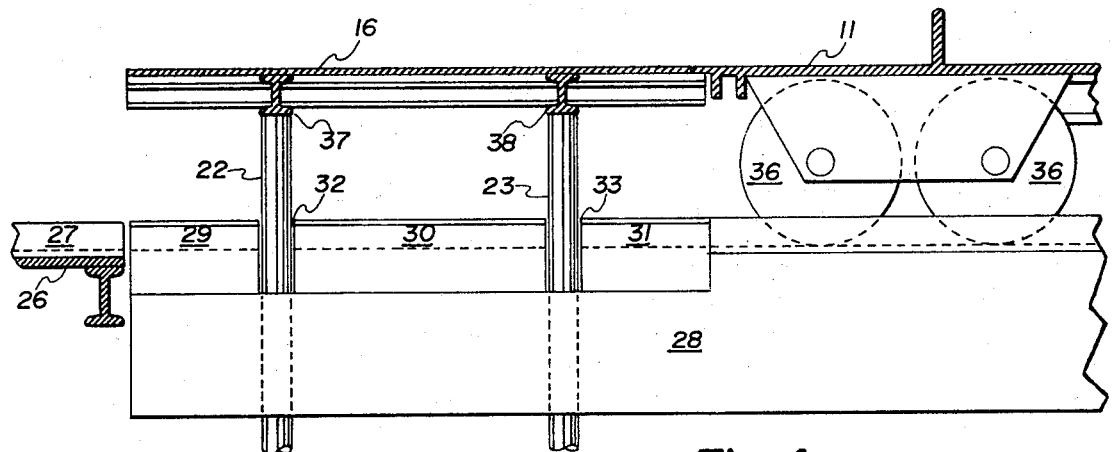
FIG. 4 is an end elevation partially in cross-section of the present invention with the walkway elevated.

Referring to FIG. 4, a pallet 34 is shown having wheels 36 in roller channel 31 of drive-through stall 28. Drive-through stall 28 also has roller channels 29 and 30. Walkway 16 is supported by support columns 22 and 23 which are attached to I-beams 37 and 38 which are positioned over recesses 32 and 33. Elevator 26 is shown having roller channel 27 opposite roller channel 29 of drive-through stall 28.

Referring to FIG. 5, pallet 34 is again shown with wheels 36 in roller channel 31. Walkway 16 is shown having hinged panels 17 in a vertical position, walkway 16 being lowered into recess 39 of drive-through stall 28. Drive-through stall 28 has holes 34 through which support columns 22 pass to support retractable walkway 16. I-beams 37 and 38 are shown within recesses 32 and 33. Roller channels 27, 29, 30 and 31 are all exposed and lined up to allow pallet 34 to be rolled onto elevator 26.

OPERATION

Figure 5:
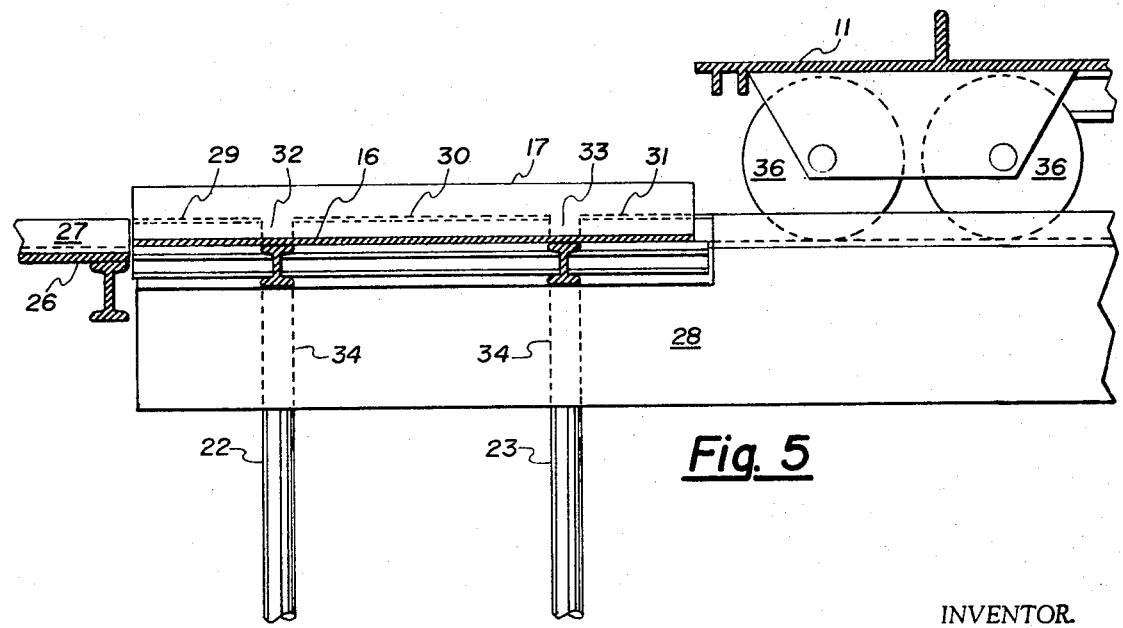
FIG. 5 is an end elevation partially sectioned of the walkway when retracted for moving the pallets.

Referring now to all of the Figures, it can be seen that elevated the walkway is elevated by support columns 22, (all of which are not illustrated), hinged panels 17 and 18 will be in their lowered positions which will produce a smooth, continuous walkway surface for passengers leaving or getting into a vehicle on a pallet, such as shown in FIG. 4. After the passengers are secure, the walkway can then be lowered (hydraulically or electrically) and panels 17 and 18, coming into contact with the roller channel surfaces, will be raised exposing roller channels 29, 30 and 31 and allowing a pallet to be transferred over to the elevator as shown in FIGS. 1 and 5.

It should be understood of course that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. In a parking system having an elevator mechanism for carrying vehicles to upper levels and a drive-through stall for the entrance of vehicles from a street level, a drive-on pallet on rollers disposed in the drive-through stall in the parking system, the drive-through stall including passenger walkways on each side of the drive-on pallet and the elevator mechanism being separated from the drive-on pallet by one of the passenger walkways and roller channels for carrying a drive-on pallet between the drive-through stall and the elevator mechanism, the retractable walkway for covering and uncovering the roller channels comprising:

a walkway carried by vertically driven support columns;
at least one hinged panel in said walkway for exposing roller tracks located beneath said walkway in its lowered position and for covering said roller tracks in its elevated position.

2. The retractable walkway of claim 1 wherein:
said at least one hinged panel comprises first and second hinged panels having abutting free ends in their closed position.

3. The retractable walkway of claim 1 wherein:
said roller tracks are carried by an elevated section, said elevated section having at least one edge in operable proximity with said at least one hinged panel for rotating said at least one hinged panel to an upward position upon retracking said walkway and thereby uncovering said roller channels.

* * * * *